United States Patent [19]

Roney

[11] 4,144,758
[45] Mar. 20, 1979

[54] RADIATION MEASUREMENT OF A PRODUCT TEMPERATURE IN A FURNACE

[75] Inventor: John E. Roney, Monroeville, Pa.

[73] Assignee: Jones & Laughlin Steel Corporation, Pittsburgh, Pa.

[21] Appl. No.: 832,674

[22] Filed: Sep. 12, 1977

[51] Int. Cl.$^2$ .............................. G01J 5/06; G01J 5/52
[52] U.S. Cl. ................................................. 73/355 R
[58] Field of Search ..................... 73/355 R, 355 EM; 356/43

[56] References Cited

U.S. PATENT DOCUMENTS 3,475,962  11/1969  Mazur ............................... 73/355 R

FOREIGN PATENT DOCUMENTS

705327  3/1954  United Kingdom .................. 73/355 R

Primary Examiner—James J. Gill
Attorney, Agent, or Firm—Robert D. Yeager

[57] ABSTRACT

Apparatus and method for measuring the surface temperature of an item in a furnace utilizing radiation detection from the item and from a cooled reference plate. The radiation signals derived from the hot item and the cooled reference plate, both of which are positioned in the furnace, are subtracted to provide an output signal which is representative of the item's surface temperature. The reflectance of the hot item and the cooled reference plate are selected to be approximately equal. The reference plate is maintained at a temperature at which it will emit insignificant radiation. When the reflected radiation from the hot item and the cooled reference plate are equal, the difference in radiation received by radiation detection pyrometers will be the radiation emitted by the hot product. The pyrometer outputs, which are subtracted, will accurately represent the hot steel temperature even for changing furnace conditions. The cooled reference plate is spaced apart from the hot item's position or travel path through the furnace and is unlikely to be damaged even in the event of a pile-up. The pyrometers selected operate at a wavelength which is not particularly susceptible to slab emittance variations.

19 Claims, 11 Drawing Figures

RADIATION MEASUREMENT OF A PRODUCT TEMPERATURE IN A FURNACE

BACKGROUND OF THE INVENTION

1. Field of the Invention

This invention relates to temperature measuring and more particularly to an apparatus and method for utilizing radiation to measure temperature of an item or product in a furnace.

2. Description of the Prior Art

An accurate measurement of the surface temperature of an item within a furnace is required for a wide variety of industrial applications. For example, measurement of steel slab temperature is needed for hot strip mill reheat furnaces, measurement of strip temperature for strip annealing furnaces, and measurement of the product temperature for many other furnaces. For convenience, in furnaces the zone temperature of the furnace is often measured rather than the slab or product temperature. A conventional method of measuring temperature in the furnace involves measurement of the furnace zone temperature using thermocouples in the furnace wall or a pyrometer sighting on the end of a ceramic tube in the wall. The measurement using a pyrometer and a ceramic tube in the wall or a thermocouple in a ceramic tube in the wall depends on the location of the tube in the sidewall and how far the end of the ceramic tube extends through the furnace wall. The indicated temperature is between the zone ambient temperature and the wall temperature. If the end of the tube extends into the zone, it measures zone temperature and varies rapidly with furnace firing conditions. If the tube is withdrawn into the wall, it measures wall temperature which responds very slowly to firing conditions. It has been observed that changing the tube tip position by one inch has changed the temperature indication by 50° F. This method of measuring product temperature has inherent limitations since variations in product load, product residence time, and furnace firing causes the zone temperature to only be indirectly related to the product temperature. Consequently, the product will often be processed at the wrong temperature and the furnace will be operated inefficiently.

The temperature of a hot body may be measured from the radiant energy which it sends out. The output of the pyrometer is a temperature indication or a signal which is related to temperature. Pyrometers have been used to directly measure product temperature in a furnace by measuring radiation from the product surface. However, temperatures indicated by a direct measurement of the radiation from the product surface are inaccurate since radiation from the burner flames and the hot furnace walls reflects off of the surface into the pyrometer. Attempts have been made to reduce or block reflective radiation and thereby increase the accuracy of the temperature measurement. Cooled shield tubes extending from the pyrometer through the furnace walls or roof to near the product surface have been used to block reflected radiation. However, these cooled shield tubes are often damaged by the product passing through the furnace or by pile-ups in the furnace which eventually damage the shield tube.

Prior art U.S. Pat. No. 2,737,809 issued to W. G. Fastie and U.S. Pat. No. 3,837,917 issued to R. C. Machler teach using two pyrometers for measuring slab temperature. The apparatus disclosed in the Fastie and Machler patents is constructed to eliminate pyrometer errors caused by emittance variations. Fastie and Machler use a heated reflector or illuminated plate controlled to be at the same temperature as the measured surface. Their use of reflected radiation from the plate is simply for the purpose of correcting the measurement for emittance, E, less than one by using the reflected radiation to create an apparent emittance of one. Furthermore, Fastie's and Machler's differential pyrometer or detector is nulled to zero, whereas my differential pyrometer has an output proportional to the emitted radiation from the measured surface. Fastie uses a heated plate close to and at an angle to the measured surface. The heated plate is regulated to be the same temperature as the measured surface temperature to form a black body. The pyrometer and controlled temperature reflector plate eliminates the effect of variable emittance. The Fastie apparatus also reduces the effect of variable smoke and path absorption. However, the Fastie invention requires a controlled temperature reflector plate which is close to and at an angle to the measured surface.

Machler obtains equivalent black body radiation from a surface by the additional reflected radiation component from a plate at the same temperature as the measured surface. The required temperature controlled plate with an emittance of approximately one, must be close to the measured surface and its temperature must be regulated to equal the measured surface temperature.

The problem with both Fastie and Machler is that a temperature controlled plate is required. Also the temperature controlled plate must be placed near the slab surface whose temperature is to be measured. The plate when located near the travel path through the furnace can easily be damaged. It is also very difficult to regulate the control plate temperature in a furnace at the surface temperature of the product. For example, in a reheat furnace the slab surface temperature can be around 2400° F., the zone temperature may be 2600° F., and the flame temperature 2950° F.

SUMMARY OF THE INVENTION

A method and apparatus for determining the surface temperature of a product in a furnace utilizing the radiation from the hot product and the radiation from a cooled reference plate or item within the furnace. In one embodiment of the invention, two pyrometers and a cooled reference plate are used to compensate for reflected flame and wall radiation which normally interferes with the direct pyrometer measurement of surface temperature. The reflectance of the cooled reference plate, which is positioned at a relatively protected location in the furnace, is selected to equal the reflectance of the hot product. When the product and the cooled reference plate reflect equal radiation, the difference in radiation received by the pyrometers is the radiation emitted by the hot product surface. This is true because the cooled reference plate does not emit significant radiation. Thus, the difference of the pyrometer signals provides an accurate, direct measurement of the hot product temperature. For the disclosed invention, combining the pyrometer signals to obtain their differences eliminates the effect of reflective radiation from flames and furnace walls.

If the flame or furnace conditions change, both the reference plate and the heated product will equal reflect the change. Therefore, the pyrometer difference signal accurately indicates the product temperature even for changing conditions. The reference plate temperature has only to be maintained low enough so that it does not emit enough radiation to cause a significant error in the measured temperature.

An important aspect of the present invention is that the reference plate does not have to be close to the surface whose temperature is measured. A problem with prior art temperature measuring devices which extend or are positioned in close proximity to the heated product is that they often are damaged by the product passing through the furnace or by a product pile-up in the furnace. The reference plate utilized in the disclosed invention can be of a very substantial nature and can be positioned at a protected location away from the product travel path. The reference plate can be located on an interior surface in the furnace above the product passage through the furnace, or below the product for a bottom temperature measurement.

It should be noted that while this explanation makes reference to a separate plate, this item may not be required if a suitable reference surface is present in the furnace. Examples of inherent furnace references are the water-cooled support pipes in a slab reheat furnace and the water-cooled rolls in a stir annealing furnace.

Various other methods can be used to obtain the radiation indication from the cooled reference plate and the product. A single pyrometer can be oscillated between a first position aimed at the hot product and a second position aimed at the cooled reference plate. The oscillation can be obtained mechanically or by oscillating a mirror in the optical path. Position sensitive switching can transfer the two signals to separate channels so that the difference signal can be obtained. The preferred method utilizes two optical pyrometer heads, one aimed at the hot product and the other aimed at the cooled plate. The outputs are connected in series opposing to obtain their difference. The preferred dual pyrometer embodiment has been found to be very satisfactory for measuring the surface temperature of moving hot steel slabs passing through a reheating furnace. Another way to obtain the desired reference signals is to utilize two detector cells behind a single lens, one detector can be positioned on one side of the optic axis and the other positioned on the other side of the optic axis. The two cells will then be aimed at two different positions in the furnace. If one cell is aimed at the hot slab and the other is aimed at the cooled reference plate, their outputs connected in series opposing will provide the desired different signal.

Equal reflective radiation from both the hot product and the cooled reference plate is not required if the reflections are proportional for furnace variations. An acceptable unequal reflective radiation condition may exist if the reflectivities of the product and the reference plate differ or if the cooled reference plate is positioned in the furnace so the reflected radiations are not equal, provided the reflected reference signal is still proportional to the reflected slab radiation for the various furnace conditions. The proportional signal obtained from the pyrometer aimed at the cooled reference plate can then be altered by an appropriate factor to make it equal to the reflective signal from the pyrometer aimed at the hot product.

The pyrometers used in practicing this invention are preferably selected to operate at a wavelength which is not particularly susceptible to slab emittance variations. Pyrometers using a wavelength of 0.9 microns have been found to be effective.

More than one pair of pyrometers can be used for measuring the product temperatures at different locations or zones in the furnace. A reference plate and pyrometer can be positioned beneath the product to measure the temperature of the bottom of the hot product.

Accurate direct measurement of product temperature is helpful in several areas, such as (a) reducing overheating and minimizing fuel consumption, (b) allowing accurate adjustment of the furnace control point and flow rate to maximize productivity. It may also be desirable to accurately check the top to bottom temperature differential of the product.

It is an object of this invention to teach an apparatus and method for radiation measurement of the surface temperature of a hot product in a furnace wherein the error caused by reflective radiation is substantially eliminated.

It is a further object of this invention to teach a dual pyrometer temperature measuring system which does not require a plate in close proximity to the surface whose temperature is being measured.

It is a further object of this invention to teach radiation temperature measurement by subtracting a radiation signal from a cooled reference plate, from a radiation signal, from the item whose temperature is being measured.

BRIEF DESCRIPTION OF THE DRAWINGS

For a better understanding of the invention, reference may be had to the preferred embodiments exemplary of the invention shown in the accompanying drawings, in which.

DETAILED DESCRIPTION OF THE PREFERRED EMBODIMENT

Figure 1:
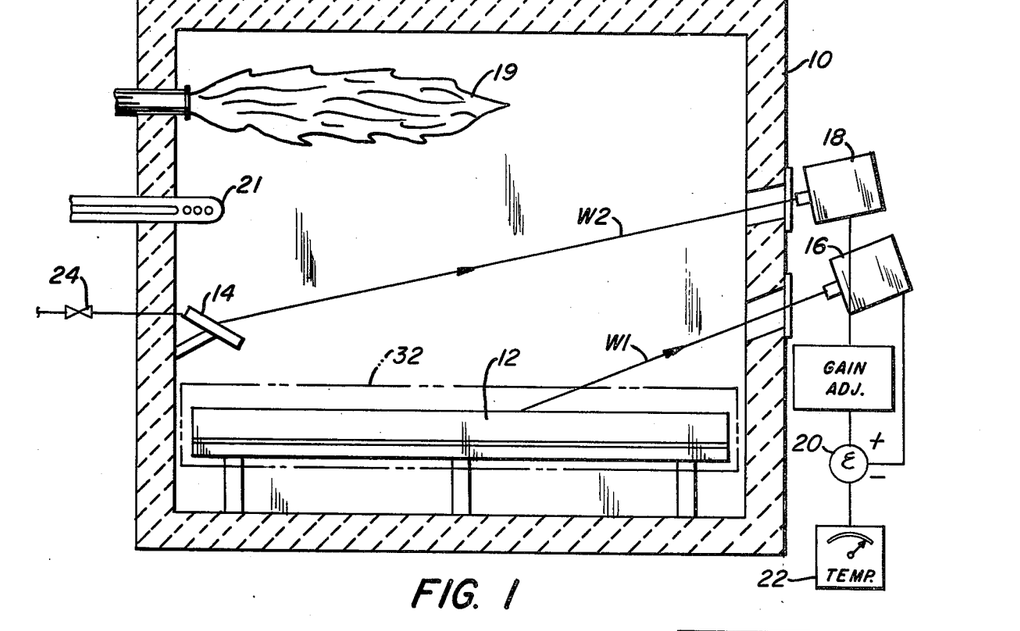
FIG. 1 is a diagram of a dual pyrometer temperature measuring apparatus constructed according to the teaching of the present invention.

Referring now to the drawings, and FIG. 1 in particular, there is shown a diagram of apparatus, constructed according to the teachings of the present invention, for measuring the surface temperature of a hot steel slab 12 within a furnace 10. Slab reheat furnace 10 may be of any well known design and includes conventional means for moving steel slabs 12 through its environment. Most commonly a slab pusher puts a new slab into the furnace at selected intervals. As each slab enters the furnace, it pushes on the slab in front of it, and this force is transmitted to move all the slabs within the furnace. When the furnace 10 is full and a new slab enters, the slab 12 at the exit will be forced out. Steel slab 12 is heated as it is intermittently moved through furnace 10. A cooled reference plate 14 is disposed within furnace 10. Radiation, W1, from the hot steel slab 12 consists of emitted radiation and reflected radiation while the radiation, W2, from cooled reference plate 14 is almost solely reflected radiation. A first pyrometer 16 is aimed at the steel slab 12 and a second pyrometer 18 is aimed at the cooled reference plate 14. Reference plate 14 is cooled below a temperature at which emitted radiation is not significant. The radiation from cooled reference plate 14 is thus almost completely reflected radiation. The reflectivity, Rr, of cooled reference plate 14 is selected to be equal to the reflectivity, Rs, of the steel slab 12. If the radiation, Eg1, impinging on steel slab 12 is equal to the energy, Eg2, impinging on reference plate 14, then the reflected radiation from steel slab 12 and the cooled reference plate 14 will be equal. Since only reflected radiation comes from cooled reference plate 14, when a signal proportional to the radiation from a selected target area on reference plate 14 is subtracted from a signal proportional to a similar size selected target area on steel slab 12 the result is a signal proportional to the emitted radiation, Em, from the steel slab 12. This can be expressed mathematically as follows:

$W1 = RsEg1 + Em$
$W2 = RrEg2$
$W1 - W2 = Em$

This result shows that the difference of the signals from pyrometers 16 and 18 is a signal proportional only to the emitted radiation from steel slab 12. The signals from pyrometers 16, 18 are subtracted one from the other at summing junction 20. The output of summing junction 20 is fed to temperature indicator 22, which provides a visual indication of slab temperature. Reflective radiation from the cooled reference plate 14 and the measured surface of steel slab 12 are equal if Rs = Rr and Eg1 = Eg2. Reflectance of the reference and the steel slab are selected to be equal. The location of the reference plate is selected so that Eg1 and Eg2 are approximately equal. The temperature of the reference plate 14 need be kept only low enough so that its emitted radiation will not cause an error in the measurement of W2. For example, for an oxidized steel surface, at 2400° F. if the temperature of the reference plate 14 is maintained at 1690° F. or lower, its emitted radiation will cause an error of less than 10° F. in a temperature measurement with pyrometers sensitive at the wavelength of 0.9 microns. Preferably the temperature of the reference plate should be maintained at less than 1200° F. If reference plate 14 is maintained below 1200° F. then temperatures as low as 1600° F. can be measured with less than 10° F. error caused by emitted radiation from reference plate 14. Maintaining the reference plate 14 below a selected temperature is easily accomplished by providing water cooling. The reference plate 14 temperature does not have to be accurately controlled or measured, and only has to be low enough not to emit radiation which causes interference with the measured temperature.

A more detailed mathematical analysis of the invention is as follows:

$$W1 = Es \frac{C1}{\lambda^5} e^{-\frac{C2}{\lambda Ts}} + Rs \frac{C1}{\lambda^5} e^{-\frac{C2}{\lambda Tf}} + Rs\, Er \frac{C1}{\lambda^5} e^{-\frac{C2}{\lambda Tr}}$$

$$W2 = Rp \frac{C1}{\lambda^5} e^{-\frac{C2}{\lambda Tf}} + Rp\, Er \frac{C1}{\lambda^5} e^{-\frac{C2}{\gamma Tr}}$$

when $Rs = Rp$ $$W = W1 - W2 = Es \frac{C1}{\lambda^5} e^{-\frac{C2}{\lambda Ts}}$$

thus W = radiation emitted from the hot steel slab surface.

In the above equations:
W1 = Radiation from hot steel
W2 = Radiation from cooled plate
Es = Steel Emittance
Er = Flame Emittance
Rs = Steel Reflectance
Rp = Cooled plate reflectance
Ts = Steel Temperature
Tf = Furnace Wall Temperature
Tr = Flame Temperature
$\lambda$ = Pyrometer operating wavelength
C1, C2 = Radiation constants A sample calculation is as follows:
Ts = 2000° F.
Tf = 2400° F.
Tr = 2900° F.
Es = 0.8
Er = 0.4
Rs = Rp = 0.2
$\lambda$ = 0.9 microns $W1 = 0.8(0.525) + 0.2(2.699) + (0.2)(0.4)(12.07) = 0.420 + 0.540 + 0.966$ $W2 = 0 + 0.2(2.699) + (0.2)(0.4)(12.07) = 0 + 0.540 + 0.966$ W = W1 − W2 = 0.420 watts/cm² = radiation emitted by oxidized steel surface at 2000° F. with an emittance of 0.8.

In practicing the invention with the above parameters the output from pyrometer 16 is a signal proportional to 1.926 watts/cm² and the output from pyrometer 18 is a signal proportional to 1.506 watts/cm². The signal obtained when the outputs from pyrometers 16 and 18 are subtracted at summing junction 20 is equivalent to 0.420 watts/cm². With an emittance of 0.8, the signal equivalent to 0.420 watts/cm² represents a steel surface temperature of 2000° F. The temperature indicating instrument 22 is thus calibrated to indicate a temperature of 2000° F. for an input signal equivalent to 0.420 watts/cm². If the emittance is different than 0.8, the temperature indicating instrument 22 is calibrated accordingly. In fact, in actual test installations, the emittance was determined to be 0.85±0.03 for most hot steel slabs.

Figure 5:
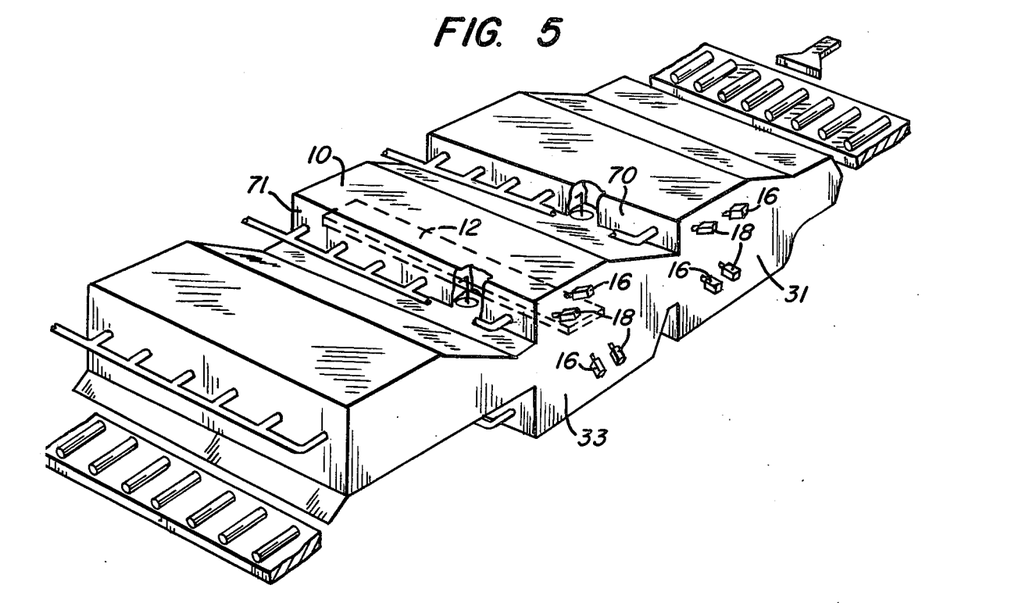
FIG. 5 is a view of a five zone slab reheat furnace showing dual pyrometer installations on the top and bottom primary zones and the top and bottom intermediate zones.

The amount of emitted radiation which can be tolerated from the reference plate 14 depends on the temperature of the slab 12 which is being measured. For a relatively hot slab 12 greater emitted radiation from reference plate 14 is permissible without introducing significant system error. In a furnace 10 having different zones 31, 33, such as shown in FIG. 5, the temperature in the zones may differ. In a zone where the slab 12 temperature is lower, reflected radiation represents a greater percentage of the energy seen by the pyrometers 16, 18. For example in the primary zone 31 reflected radiation is 75% of the radiation seen by pyrometer 16 while in the intermediate zone 33 reflected radiation may be only 25% of the radiation. This difference in reflected radiation as a percent of combined emitted and reflected radiation may increase system error by several degrees. Tests run at 1700° F. and different firing rates however indicate the effect is generally small.

Emitted radiation is a function of surface temperature, therefore subtraction of the pyrometer 16, 18 signals will provide a signal representative of the slab 12 surface temperature. If the flame or other furnace conditions change, both the slab 12 and reference plate 14 will equally reflect the change. Thus, the disclosed apparatus and method will continuously compensate for varying furnace 10 conditions.

In FIG. 1 radiations, W1 and W2 are sensed by pyrometers 16 and 18 respectively. Furnace 10 is heated by fuel burning in a flame 19. A temperature sensor 21 can be provided within a wall of furnace 10 for sensing wall or zone temperature. The outputs of pyrometers 16, 18 are combined by summing means 20 to get the difference signal. The output of the summing means 20, to which temperature indicator 22 responds, provides a difference signal which is a function of the temperature of steel slab 12. Cooling water is fed in line 24 through the furnace 10 wall to cool steel plate 14. The amount of cooling water required depends on the furnace temperature. The temperature of plate 14 does not have to be controlled with a great deal of accuracy, it must just be maintained below some selected maximum such as 1200° F.

Furnace 10 firing conditions can significantly change the reflected flame radiation which has to be canceled by the dual pyrometer system. Burner fuel flow effects the amount of flame radiated energy. Air flow to the furnace burner determines the flame length. The amount of reflected radiant energy from the flame is a function of flame length and temperature. The accuracy of the dual pyrometer system was checked for various furnace conditions. Some abnormal conditions such as unburned fuel burning in front of the target area and the flame moving into the pyrometer sight path cause erratic pyrometer readouts. These abnormal pyrometer readouts are readily apparent to the furnace operator.

Figure 2:
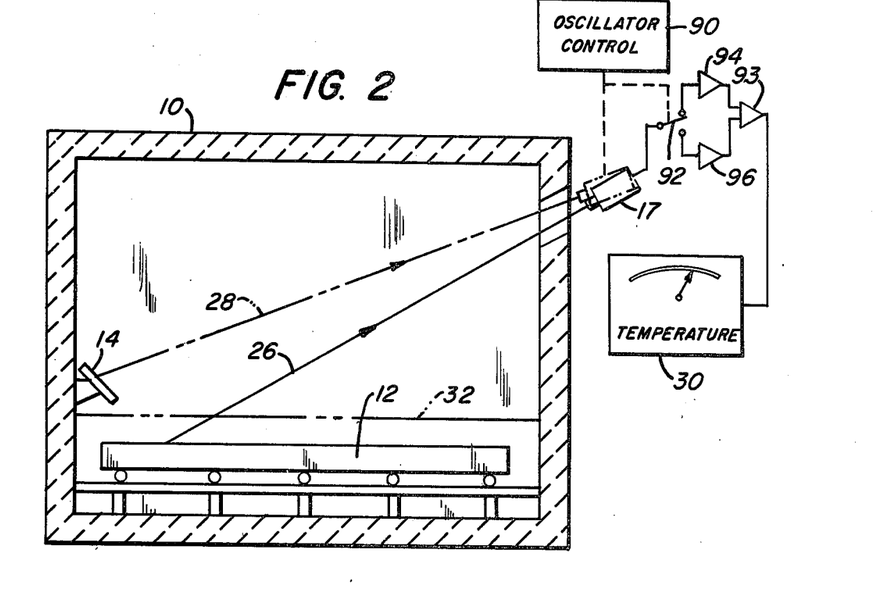
FIG. 2 is a diagram of a temperature measuring apparatus of an alternate embodiment of the present invention utilizing a single pyrometer.

Referring now to FIG. 2 there is shown another embodiment of the invention wherein a single pyrometer 17 is used. Pyrometer 17 is oscillated between a first position aimed at steel plate 12 along path 26 and a second position aimed at cooling plate 14 along path 28. Pyrometer 17 thus alternately views plate 14 and slab 12 for a selected time. An oscillator control 90 moves pyrometer 17 between the first position and the second position. Oscillator control 90 operates switch 92 in synchronism with pyrometer 17. The output signal from pyrometer 17 is fed to position sensitive switch 92 which transfers the pyrometer 17 signal between two amplifiers 94, 96. Amplifier 94 receives the signal when pyrometer 17 is aimed at slab 12 and amplifier 96 receives the signal when pyrometer 17 is aimed at cooled reference plate 14. The signal from amplifier 96 is subtracted from the signal from amplifier 94 by differential amplifier 98. The output signal from differential amplifier 98 is proportional to the emitted radiation from the slab 12 and hence is representative of the surface temperature of slab 12. Means 30 is also provided with a temperature indicator which responds to the difference signal from amplifier 98 to provide an accurate indication of slab 12 temperature.

A passage or opening 32 is diagramatically indicated through furnace 10. This passage is defined by the furnace construction and indicates the area within which the slabs should stay even under abnormal or accident conditions. Note that cooled reference plate 14 is located outside of this area so that it will not be readily damaged by slabs passing through furnace 10 or accidental occurrences, such as a slab pile up in furnace 10. This can be contrasted with the apparatus disclosed in prior art U.S. Pat. Nos. 2,737,809; and 2,837,917 which require a plate in close proximity to the slabs. Having a reference plate away from the slabs is very advantageous.

Figure 3:
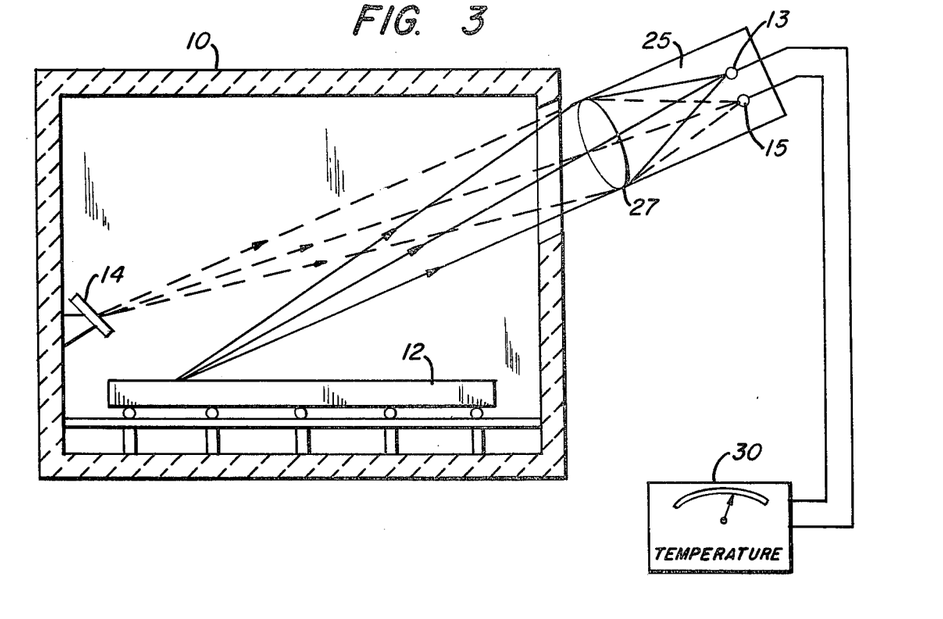
FIG. 3 is a diagram of a temperature measuring apparatus, representing another alternate embodiment of the present invention, utilizing two radiation sensors aimed through a single objective lens.
Figure 4:
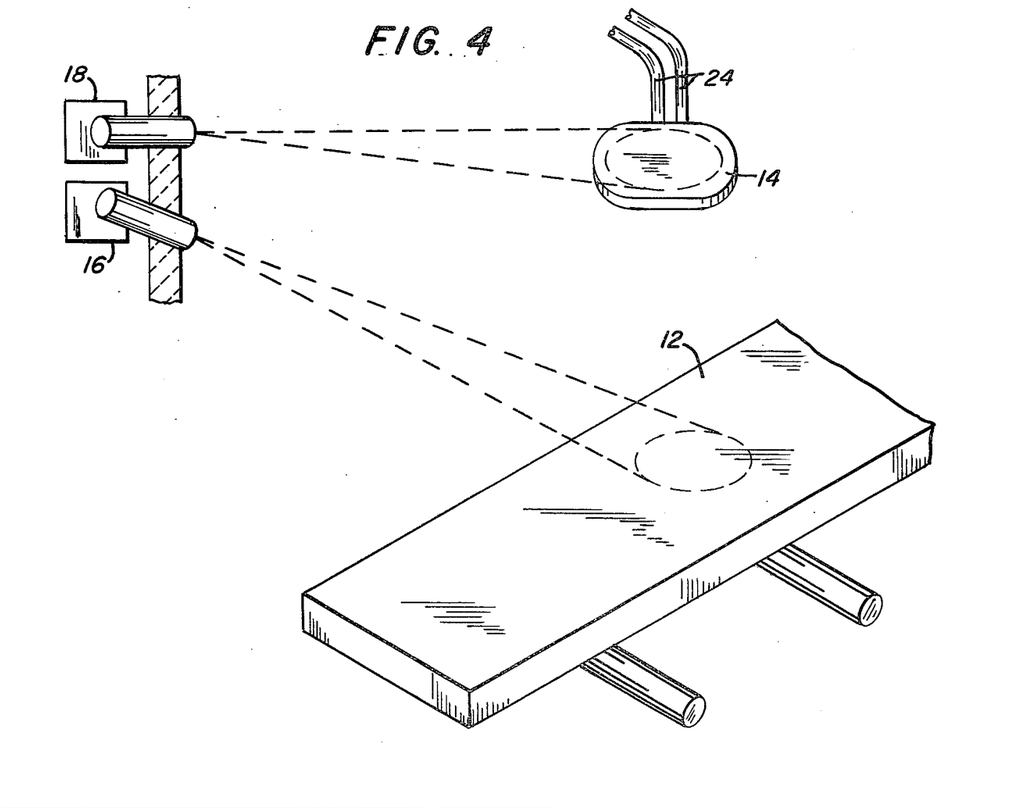
FIG. 4 is a diagram of a dual pyrometer temperature measuring device with portions not shown for clarity.

FIG. 3 shows a diagram of the optical head of a pyrometer 25 with two detector cells 13, 15. These two cells 13, 15 can be positioned off the optic axis of objective lens 27. When thus positioned each detector cell 13, 15 will be aimed in a different direction into furnace 10. This is illustrated by the ray traces in FIG. 3. Detector 13 will be aimed at the slab surface 12 and detector 15 will be aimed at the cooled reference plate 14. The detector 13, 15 outputs can be connected in series with opposing voltages or they can be amplified and the two amplified signals subtracted from each other to get the difference signal. This dual detector cell pyrometer 25 essentially combines two pyrometers into one housing and performs the same function as the two separate pyrometers 16, 18 shown in FIG. 1.

The pyrometers 16, 18 should be mounted at a location where they can be aimed at the slab 12 and reference plate 14 without having their sight path effected by the burner flame 19. In a permanent installation the pyrometers 16, 18 can be insulated and attached directly to the furnace structure to maintain the sensing head temperature below a selected temperature. A heat shield and a water cooled assembly can be provided between pyrometer head 16 or 18 and the sight tube 54. Filtered air is blown through the sight tube for cooling and preventing particles from depositing on the pyrometer lenses.

The amount of radiant energy emitted and reflected by slab 12 is a function of surface condition. An oxide surface scale is formed as the slabs heat. In the preferred embodiment the dual pyrometer system is calibrated for a value of slab emittance of 0.85. The emittance was measured for various samples under various operating conditions. The sample emittances were observed to be in the range of 0.85±0.03. Based on this data it was calculated for a pyrometer that detects at a wave length of 0.9 microns and a slab surface temperature of 2400° F., an emittance variation of ±0.03 can change the pyrometer indication by ±10° F.

As slab 12 heats in the furnace the oxide scale layer which is formed on the surface can at some point create a thermal barrier between the furnace and the body of the slab. The temperature difference across the scale layer is proportional to the thickness of the oxide layer.

The time lag, which is the time required for a temperature change to travel across the oxide layer, is proportional to the square of the thickness. Since pyrometer 16 optically views the slab surface scale, at some point the thickness of the scale layer causes pyrometer readings which are not representative of the subsurface temperatures. The scale problem is most acute on low carbon steel. When the scale thickness is too great, no measurement agreement is possible. Thus if a steel slab is maintained in the furnace for too long a length of time, a scale coating will form which can seriously effect the accuracy of temperature readings. The effect of the scale formed on stainless steel slabs was generally found to be negligible.

A long term source of error may be introduced if refractory and metallic oxides are allowed to accumulate on the target surface of reference plate 14. This accumulation can introduce excessive error if allowed to become too great. Regular cleaning of the reference plate eliminates this source of error.

Figure 6:
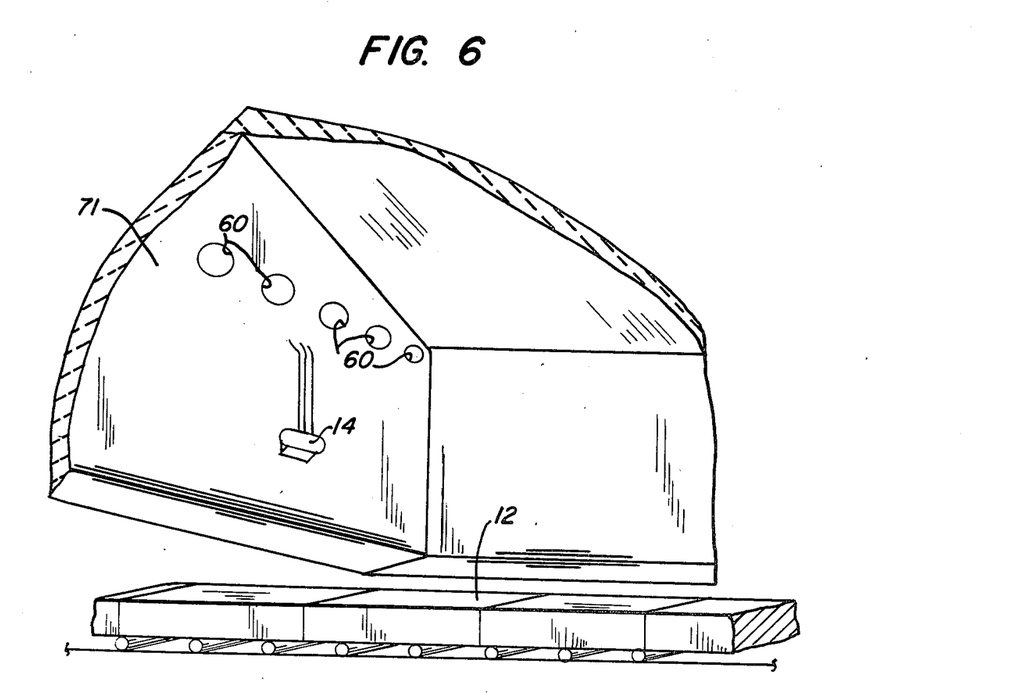
FIG. 6 is a view showing the cooled reference plate mounted on a wall of a reheat furnace through which the burners extend.

Referring now to FIGS. 5 and 6 there is shown a slab furnace 10 with four dual pyrometer installations. The cooled reference plate 14 is mounted on the burner wall where the burners 60 enter furnace 10. The upper pyrometers 16, 18 determine the temperature of the top of the steel slab 12 and the lower pyrometers 16, 18 determine the temperature of the bottom of the slab 12. The upper and lower burners are independently controllable and also the support pipes may cause a difference between the top and bottom heating. Thus the top surface temperature may not be the same as the bottom surface temperature.

Figures 7, 8:
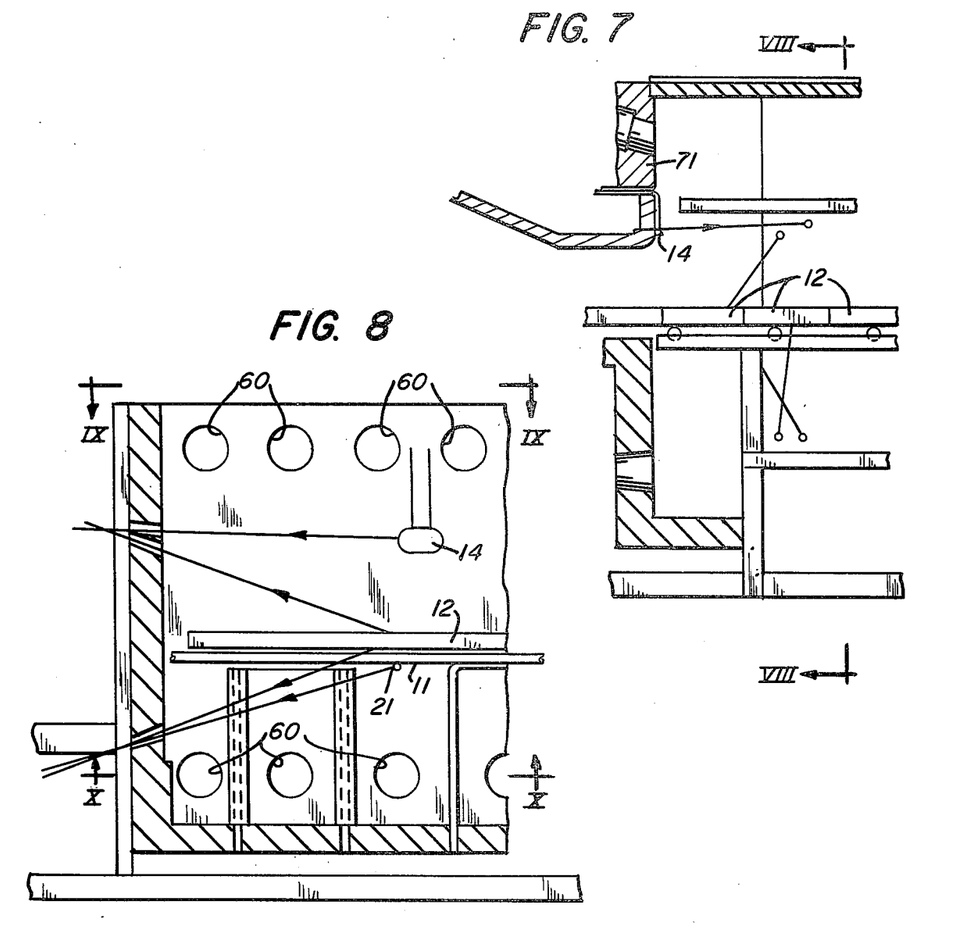
FIG. 7 is a side section view showing a portion of the slab reheat furnace of FIG. 4 with dual pyrometers installed in the top and bottom zones.
FIG. 8 is a view taken along the line VIII—VIII of FIG. 7.
Figure 9:
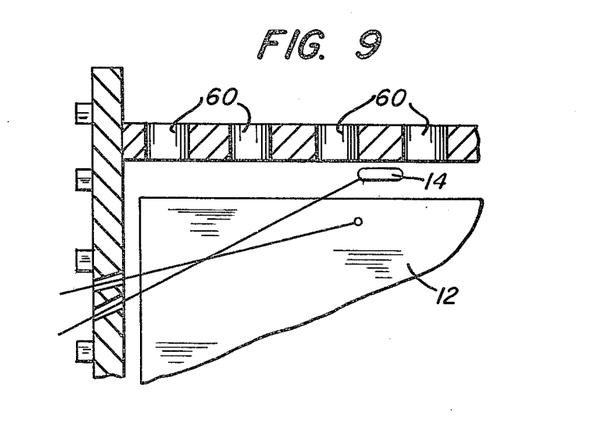
FIG. 9 is a view taken along line IX—IX of FIG. 8.
Figure 10:
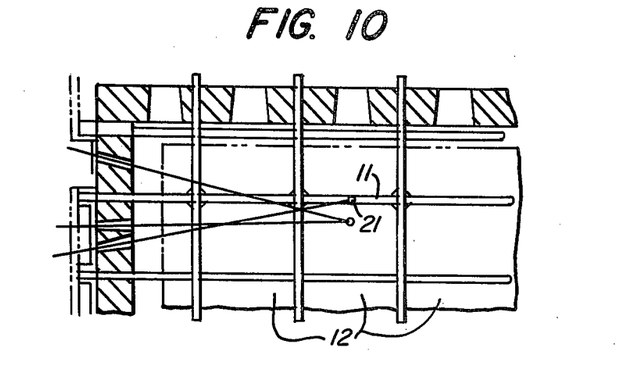
FIG. 10 is a view taken along line X—X of FIG. 8.

FIGS. 7, 8, 9 and 10 show more detailed views of the furnace and sight path into a furnace with dual upper and lower pyrometers, as shown in FIG. 5. The sight path for the dual pyrometer are arranged so they do not pass through the burner flames and are not directly effected thereby. FIG. 7 is a side section view of a portion of a furnace as shown in FIG. 5. Dual pyrometers 16, 18 are provided above and below slab 12. FIG. 8 is a view of FIG. 7 generally along the line VIII—VIII. FIG. 9 shows clearly reference plate 14 mounted on burner wall 71 above the open passage through furnace 10. For measurement of slab bottom temperature the surface 21 of a water cooled support pipe 11 provides the cooled reference source. Thus, in this instance, a separate water cooled reference plate 14 is not required for the temperature measurement.

Figure 11:
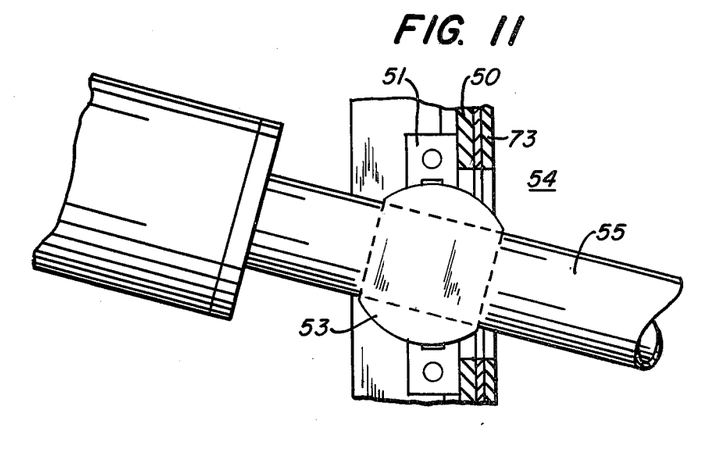
FIG. 11 is a detailed view showing a typical cross-section arrangement for a sight tube extending through the furnace wall.

FIG. 11 is a typical cross-section arrangement for an adjustable sight tube assembly 54. A sight tube 55 which has a pyrometer attached to its outer end is aimable within furnace 10. A swivel socket plate 51 is attached to mounting plate 50. Plate 51 engages a partial spherical member 53 which supports the sight tube 55. This allows the position of sight tube 55 to be adjusted to aim at the desired target area on the cooled reference plate 14, the cooled reference surface 21 or the hot slab 12. The mounting plate 50 is connected to a stable portion of furnace 10 at a support column.

As can be seen the disclosed temperature sensing apparatus has numerous advantages over the prior art. No heated plate which requires accurate temperature control is needed. The cooled reference plate 14 or reference surface 21 which is utilized does not have to be in close proximity to the slab 12, and in fact can be mounted in a position where it is unlikely to be damaged by a slab pile up. The temperature of the cooled reference plate 14 does not have to be closely regulated but must only be below a temperature selected so that any error caused by emitted radiation is not significant.

The disclosed method has been verified experimentally by using a single pyrometer which was alternately aimed at a hot steel plate and a cooled reference plate in a gas fired furnace. The difference in the two temperature indications was used to calculated what the hot steel temperature indication would be if one pyrometer signal was subtracted from the other. These experiments proved the method for steady state furnace and plate conditions.

To prove the method for variable furnace conditions and on a production furnace the dual pyrometer system was built and installed on a reheat furnace through which slabs traveled.

What is claimed is:
1. Temperature measuring apparatus for measuring the surface temperature of a hot item in a furnace comprising:
 a reference plate disposed within the furnace;
 means for cooling the reference plate below a predetermined temperature at which its emitted radiation is not significant;
 item radiation detecting means for providing an output signal proportional to the emitted plus reflected radiation from the hot item;
 reference plate radiation detecting means for providing an output signal proportional to the reflected radiation from said reference plate; and,
 means for substracting the output signal of said reference plate radiation detecting means from the output signal of said item radiation detecting means.

2. Temperature measuring apparatus as claimed in claim 1 wherein:
 said item radiation detecting means comprises a first pyrometer aimed at the hot item; and,
 said reference plate radiation detecting means comprises a second pyrometer aimed at said reference plate.

3. Temperature measuring apparatus as claimed in claim 1 wherein:
 said item radiation detecting means and said reference plate radiation detecting means comprise a common pyrometer which is oscillated between a first position aimed at the hot item and a second postion aimed at said reference plate; and,
 oscillating control means for oscillating said common pyrometer between said first and second positions.

4. Temperature measuring apparatus as claimed in claim 3 comprising:
 position sensitive switching means for differentially combining the pyrometer output signal obtained when said common pyrometer is in the first position aimed at the hot slab with the pyrometer output signal obtained when said common pyrometer is in the second position aimed at said reference plate.

5. Temperature measuring apparatus as claimed in claim 1 comprising:
 an objective lens;
 said item radiation detecting means aimed through said objective lens at a first angle onto the item; and,
 said reference plate radiation detecting means aimed through said objective lens at a second angle onto said reference plate.

6. Temperature measuring apparatus as claimed in claim 1 comprising:

gain adjustment means connected to change the relative strength of the signals from said item radiation detecting means and said reference plate radiation detecting means.

7. Temperature measuring apparatus as claimed in claim 1 wherein:
said item radiation detecting means and said reference plate radiation detecting means are sensitive to radiation having a wavelength of approximately 0.9 microns.

8. Temperature measuring apparatus as claimed in claim 1 wherein:
the furnace is constructed to define a longitudinal passage therethrough in which items move through the furnace;
means for moving the items through the longitudinal passage in the furnace; and,
said reference radiation detecting means is mounted in said furnace outside of the longitudinal passage therethrough.

9. Apparatus for sensing the temperature of a product in a furnace comprising:
a reference surface within the furnace;
cooling means for keeping said reference surface below a predetermined temperature at which its emitted radiation is not significant;
first aperture means formed in the furnace for providing sight paths into the interior of the furnace;
a first pair of radiating detectors aimed into the furnace through said first aperture means, one aimed at the top of the product and the other aimed at said reference surface; and,
combining means for combining the output signals from said pair of radiation detectors.

10. Apparatus as claimed in claim 9 wherein:
said reference surface is a cooled support pipe within the furnace.

11. Apparatus as claimed in claim 9 wherein:
said reference surface is a cooled part of the furnace structure.

12. Apparatus as claimed in claim 9 wherein:
said reference surface is an upper reference plate positioned within the furnace.

13. Apparatus as claimed in claim 12 comprising:
a lower reference plate positioned within the furnace;
said cooling means also cools said lower reference plate below a predetermined temperature at which its emitted radiation is not significant;
second aperture means formed in the furnace for providing sight paths into the interior of the furnace;
a second pair of radiation detectors aimed into the furnace through said second aperture means, one aimed at the bottom of the product and the other aimed at said second reference plate; and,
second combining means for combining the output signals from said second pair of radiation detectors.

14. Apparatus as claimed in claim 13 wherein:
said first pair of radiation detectors and said second pair of radiation detectors detect radiation having a wavelength approximately equal to 0.9 microns.

15. Apparatus as claimed in claim 13 comprising:
openings formed in the ends of the furnace defining a longitudinal path through the furnace along which the products travel as they move through the furnace;
means for moving products through the furnace; and,
said upper reference plate is mounted in the furnace above the passage therethrough.

16. Apparatus as claimed in claim 15 wherein:
said lower reference plate is mounted within the furnace below the passage therethrough.

17. A method of measuring the temperature of a hot product in a furnace comprising the steps of:
disposing a reference plate having approximately the same reflectivity as the product in the furnace;
cooling the reference plate to a temperature at which its emitted radiation is not significant;
measuring the radiation from the hot product to obtain a signal proportional to the emitted and reflected radiation from the hot product;
measuring the radiation from the reference plate to obtain a signal proportional to the radiation reflected by the cooled reference plate; and,
combining the signals to obtain a difference signal approximately proportional to the radiation emitted from the hot slab.

18. A method as claimed in claim 17 comprising the additional steps of:
adjusting the relative strengths of the signal obtained from the hot product and the signal obtained from the reference plate so that the reflective radiation portions of the signals are equal.

19. Temperature measuring apparatus for measuring the temperature of a hot slab in a furnace having a pyrometer disposed to have an output signal related to the radiation from the hot slab, the improvement comprising:
a reference plate positioned within the furnace;
cooling means for cooling the reference plate relative to the hot slab to a temperature at which its emitted radiation is not significant;
a second pyrometer disposed to provide an output signal related to the radiation from the reference plate; and,
differential combining means for substracting the output signals from the two pyrometers.

* * * * *